United States Patent
Umehara et al.

(10) Patent No.: US 9,555,762 B2
(45) Date of Patent: Jan. 31, 2017

(54) AIRBAG DEVICE FOR MOTOR VEHICLE

(71) Applicant: NIHON PLAST CO., LTD., Shizuoka (JP)

(72) Inventors: Junichi Umehara, Shizuoka (JP); Chiari Saito, Shizuoka (JP); Kyohei Yoneyama, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 0 days.

(21) Appl. No.: 14/839,573

(22) Filed: Aug. 28, 2015

(65) Prior Publication Data

US 2016/0059817 A1 Mar. 3, 2016

(30) Foreign Application Priority Data

Aug. 29, 2014 (JP) .................. 2014-175970
Aug. 28, 2015 (JP) .................. 2015-168698

(51) Int. Cl.
*B60R 21/233* (2006.01)
*B60R 21/205* (2011.01)

(52) U.S. Cl.
CPC .......... *B60R 21/233* (2013.01); *B60R 21/205* (2013.01); *B60R 2021/23308* (2013.01); *B60R 2021/23324* (2013.01)

(58) Field of Classification Search
CPC ................. B60R 21/205; B60R 21/233; B60R 2021/23107; B60R 2021/23308; B60R 2021/23324; B60R 2021/2612
See application file for complete search history.

(56) References Cited

U.S. PATENT DOCUMENTS

| | | | | |
|---|---|---|---|---|
| 4,262,931 | A * | 4/1981 | Strasser ............... | B60R 21/233 280/729 |
| 5,575,497 | A * | 11/1996 | Suyama ............... | B60R 21/231 280/730.1 |
| 6,851,706 | B2 * | 2/2005 | Roberts ............ | B60R 21/23138 280/730.1 |
| 9,016,721 | B1 * | 4/2015 | Potter et al. ......... | B60R 21/239 280/739 |
| 9,150,186 | B1 * | 10/2015 | Belwafa ............... | B60R 21/233 |
| 9,272,684 | B1 * | 3/2016 | Keyser et al. ....... | B60R 21/237 |

(Continued)

FOREIGN PATENT DOCUMENTS

JP 2000-280845 A 10/2000

*Primary Examiner* — Barry Gooden, Jr.
(74) *Attorney, Agent, or Firm* — Arent Fox LLP

(57) ABSTRACT

An airbag device for motor vehicle, includes: an inflator arranged in an instrument panel in front of a front passenger seat and is capable of ejecting gas; a first airbag connected to the inflator at a base end side thereof and has a gas inflow hole through which gas can be flowed, the first airbag being for the front passenger seat; and a second airbag arranged on the first airbag at a side face portion close to a center in the vehicle width direction, the second airbag being adapted to communicate with the first airbag through first and second communication portions. The first communication portion is arranged proximal to the inflator than the second communication portion arranged proximal to the occupant side end. The first communication portion and the second airbag are communicated via a communication passageway, and the second communication portion and the second airbag are communicated directly.

3 Claims, 5 Drawing Sheets

(56) References Cited

U.S. PATENT DOCUMENTS

| | | | |
|---|---|---|---|
| 2003/0020264 A1* | 1/2003 | Abe | B60R 21/233 280/729 |
| 2003/0030254 A1* | 2/2003 | Hasebe | B60R 21/233 280/729 |
| 2003/0034637 A1* | 2/2003 | Wang | B60R 21/233 280/729 |
| 2003/0034638 A1* | 2/2003 | Yoshida | B60R 21/233 280/729 |
| 2003/0094794 A1* | 5/2003 | Amamori | B60R 21/231 280/729 |
| 2003/0116945 A1* | 6/2003 | Abe | B60R 21/231 280/729 |
| 2008/0048420 A1* | 2/2008 | Washino | B60R 21/203 280/731 |
| 2015/0158452 A1* | 6/2015 | Choi | B60R 21/233 280/732 |
| 2015/0166002 A1* | 6/2015 | Fukawatase | B60R 21/233 280/730.1 |
| 2015/0258958 A1* | 9/2015 | Belwafa | B60R 21/233 280/729 |
| 2015/0258959 A1* | 9/2015 | Belwafa | B60R 21/233 280/729 |
| 2015/0298643 A1* | 10/2015 | Schneider | B60R 21/233 280/729 |
| 2015/0307056 A1* | 10/2015 | Cheng | B60R 21/231 280/729 |
| 2016/0144820 A1* | 5/2016 | Shin et al. | B60R 21/239 280/735 |

* cited by examiner

AIRBAG DEVICE FOR MOTOR VEHICLE

CROSS REFERENCE TO RELATED APPLICATIONS

This application claims priority of Japanese Patent Applications No. 2014-175970 filed on Aug. 29, 2014 and 2015-168698 filed on Aug. 28, 2015. The contents of these applications are incorporated herein by reference in their entirety.

BACKGROUND OF THE INVENTION

1. Field of the Invention

The present invention relates to an airbag device for motor vehicle.

2. Description of the Related Art

As a conventional airbag device for motor vehicle, it has been known as the related art that there is provided the one that is made of: an airbag for front passenger seat, which is arranged so as to be able to protect a behavior to a front side of an occupant who sits down on the front passenger seat of an instrument panel; and a center side airbag, which is arranged so as to be able to protect a behavior to a transverse center side, in other words, in an oblique direction of an occupant who sits down on the front passenger seat similarly, and to protect a behavior to a center of an occupant who sits down on a transverse center side seat (indicating a seat existing between a driver seat and the front passenger seat) (Japanese Unexamined Patent Application Publication No. 2000-280845). Between the center side airbag and the airbag for front passenger seat of the airbag device, a partitioning portion is provided to partition these airbags. An inflator having been provided on the instrument panel is connected to the center side airbag, and in the partitioning portion, a communication hole adapted to cause the airbag for front passenger seat and the center side airbag to communicate with each other is opened, and in a side part of the airbag for front passenger seat, an exhaust hole adapted to communicate with the outside is opened.

However, the related art is directed to a structure in which the center side airbag is inflated by gas that is ejected from the inflator and subsequently the airbag for front passenger seat starts its inflation via the communication hole; and therefore, owing to a characterizing feature that the flow of the gas has linearity, it becomes difficult for the gas to efficiently flow into the airbag for front passenger seat, and the inflation and expansion speed of the airbag for front passenger seat is prone to become slow.

SUMMARY OF THE INVENTION

The present invention provides an airbag device for motor vehicle, the airbag device being capable of increasing an inflation and expansion speed of a respective one of an airbag for front passenger seat and a center side airbag.

An airbag device for motor vehicle according to an aspect of the present invention, includes: an inflator that is arranged in an instrument panel at an area in front of a front passenger seat and is capable of ejecting gas; a first airbag that is connected to the inflator at a base end side thereof and has a gas inflow hole through which gas can be flowed, the first airbag being for the front passenger seat; and a second airbag arranged on the first airbag at a side face portion close to a center in the vehicle width direction, the second airbag being adapted to communicate with the first airbag through communication portions that are formed on the first airbag at the side face portion to which the second airbag is arranged, and includes: at least a first communication portion and a second communication portion; an intake hole formed in the second airbag adjacent to the first communication portion; and a communication passageway having a predetermined length, wherein the first communication portion is arranged so as to be proximal to the inflator at the side face portion of the airbag for front passenger seat than the other communication portion, the second communication portion is arranged so as to be proximal to an occupant side end than the other communication portion on the side face portion of the first airbag after inflated and expanded, the second communication portion and the second airbag are communicated directly, and the first communication portion and the second airbag are communicated via a communication passageway communicated with the first communication portion and the intake hole.

Preferably, the second airbag is biased (offset-arranged) to the occupant side end of the side portion of the first airbag and has a volume smaller than a volume of the first airbag.

Preferably, the second airbag is integrally formed of: a communication passageway formed in a cylindrical shape together with the first airbag; and a front face portion facing to the front passenger seat (to an occupant seating the front passenger seat).

According to the aspect of the present invention, the communication portions are formed on the first airbag at the side face portion to which the second airbag is arranged, and includes: at least a first communication portion and a second communication portion; an intake hole formed in the second airbag adjacent to the first communication portion; and a communication passageway having a predetermined length, wherein the first communication portion is arranged so as to be proximal to the inflator at the side face portion of the airbag for front passenger seat than the other communication portion, the second communication portion is arranged so as to be proximal to an occupant side end than the other communication portion on the side face portion of the first airbag after inflated and expanded, the second communication portion and the second airbag are communicated directly, and the first communication portion and the second airbag are communicated via a communication passageway communicated with the first communication portion and the intake hole. In this manner, when the gas that is ejected from the inflator is flowed into the first airbag through the gas inflow hole, the first airbag inflates and expands in an early stage and the gas that is ejected in an early stage from the first communication portion that is proximal to the inflator to the outside of the first airbag flows into the second airbag through the intake hole via the communication passageway and the gas that is ejected from the second communication portion to the outside of the first airbag flows into the second airbag. As a result, there is attained an advantageous effect that the inflation and expansion speed of the center side airbag can be increased, etc.

Moreover, the second airbag is biased to the occupant side end of the side portion of the first airbag and has a volume smaller than that of the first airbag; and therefore, there is attained an advantageous effect that a speed for establishment of an inflation and expansion state in which the occupant for the second airbag can be protected increases and moreover the gas capacity of the inflator can be reduced and the manufacturing costs can be reduced.

Moreover, in so far as the second airbag is concerned, a communication passageway formed in a cylindrical shape together with the first airbag and a front face portion facing the occupant side are integrally formed; and therefore, there is attained an advantageous effect that the manufacturing costs of the second airbag can be reduced.

DESCRIPTION OF THE PREFERRED EMBODIMENTS

Figure 1:
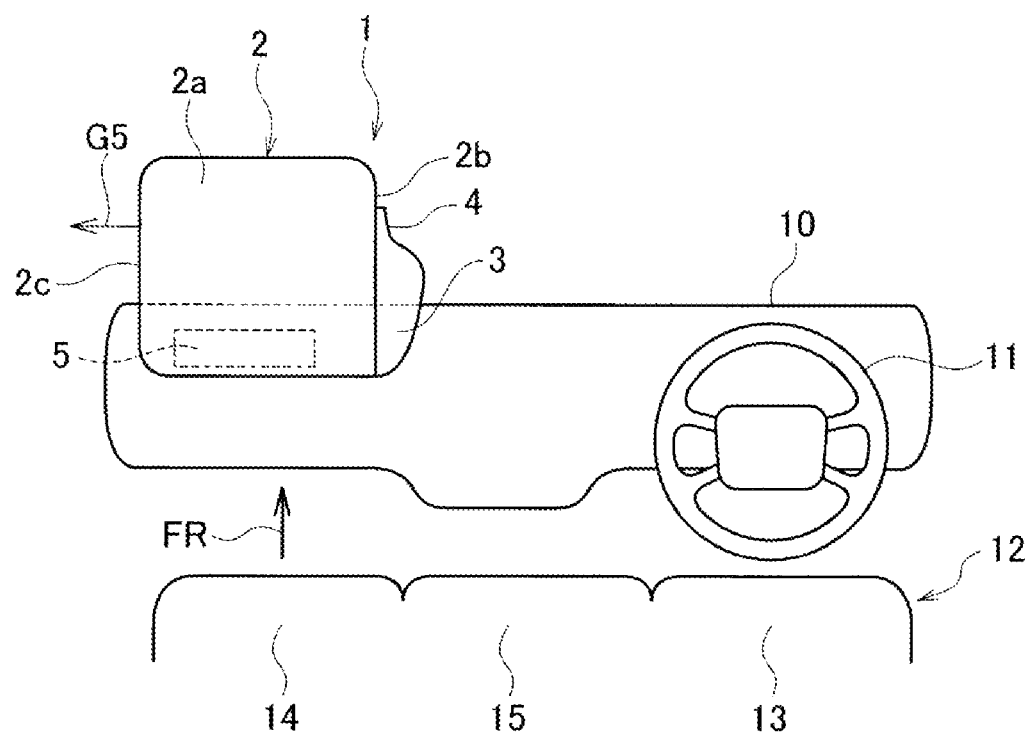
FIG. 1 is a view showing, in one combination, a front view showing a state in which an airbag for front passenger seat inflates and expands from an instrument panel according to a first embodiment of the present invention and a top view showing a relationship between the instrument panel and the airbag for front passenger seat and a front side seat.
Figure 2:
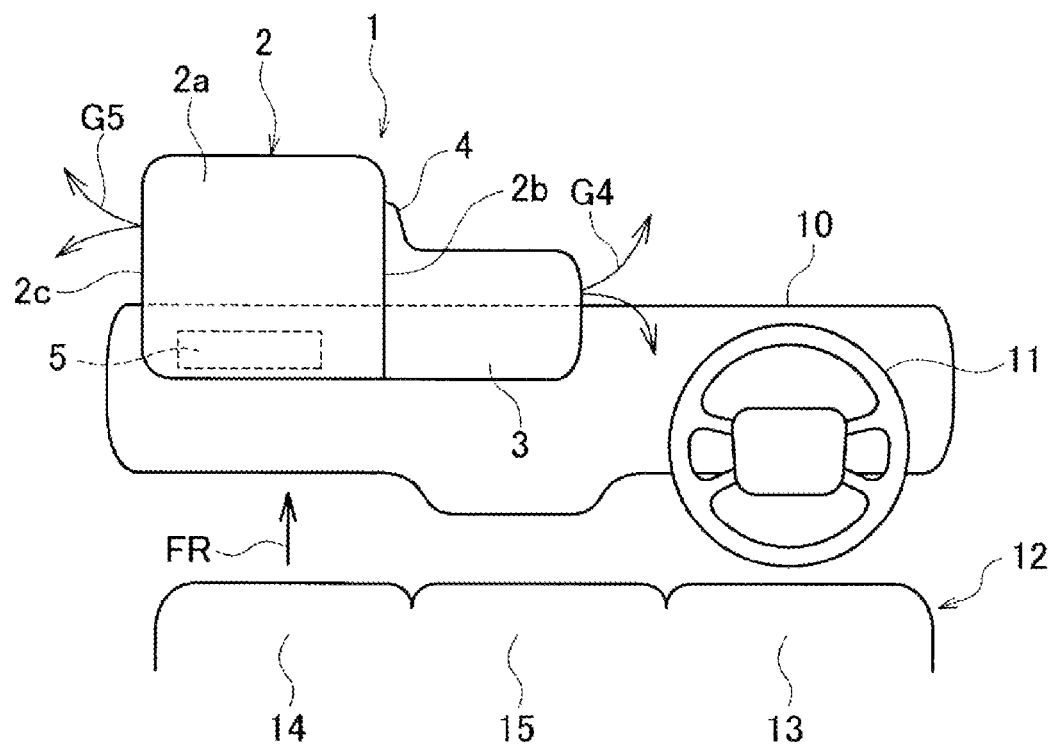
FIG. 2 is a view showing, in one combination, a front view showing a state in which an center side airbag inflates and expands from the airbag for front passenger seat of FIG. 1 and a top view showing a relationship between the instrument panel and the airbag for front passenger seat and the center side airbag and the front side seat.
Figure 3:
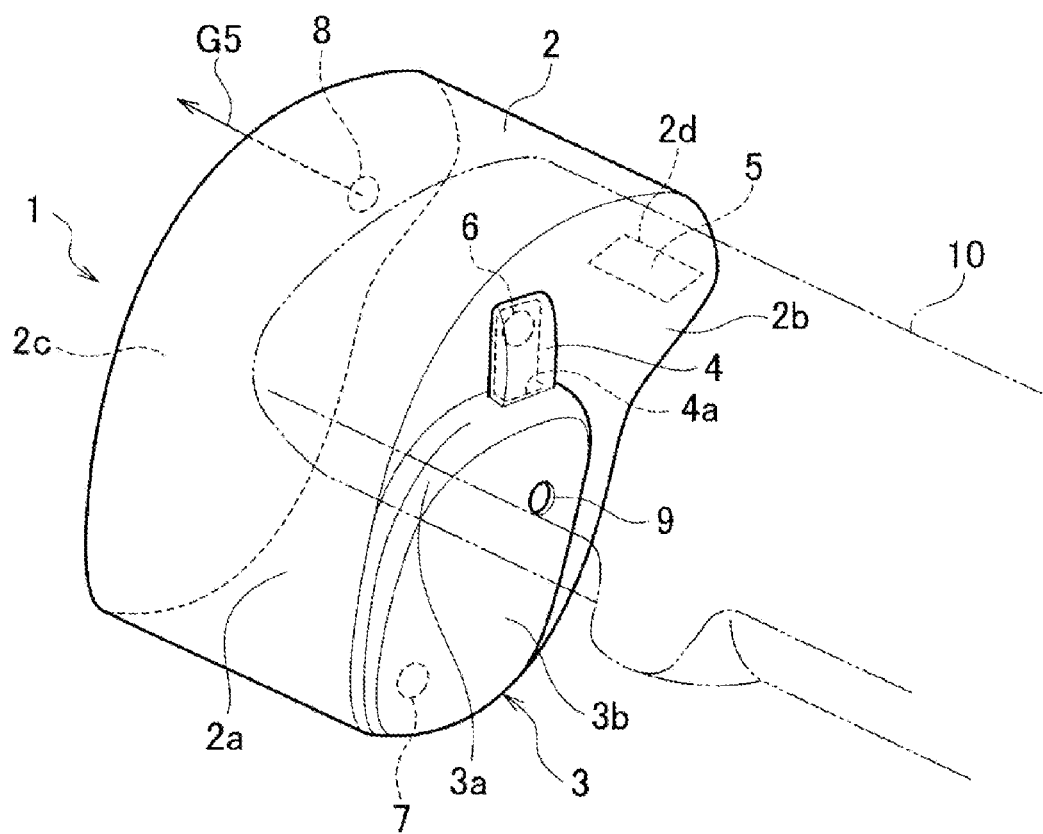
FIG. 3 is a perspective view showing a state in which the airbag for front passenger seat of FIG. 1 inflates and expands.

Hereinafter, preferred embodiments of the present invention will be described in detail. It is an object to be achieved in the present invention to provide an airbag device for motor vehicle which is capable of increasing an inflation and expansion speed of a respective one of an airbag for front passenger seat and an center side airbag. An airbag device for motor vehicle according to one aspect of the present embodiment includes: an inflator that is arranged in an instrument panel at an area in front of a front passenger seat and is capable of ejecting gas; a first airbag that is connected to the inflator at a base end side thereof and has a gas inflow hole through which gas can be flowed, the first airbag being for the front passenger seat; and a second airbag arranged on the first airbag at a side face portion close to a center in the vehicle width direction, the second airbag being adapted to communicate with the first airbag through communication portions that are formed on the first airbag at the side face portion to which the second airbag is arranged, and includes: at least a first communication portion and a second communication portion; an intake hole formed in the second airbag adjacent to the first communication portion; and a communication passageway having a predetermined length, wherein the first communication portion is arranged so as to be proximal to the inflator at the side face portion of the airbag for front passenger seat than the other communication portion, the second communication portion is arranged so as to be proximal to an occupant side end than the other communication portion on the side face portion of the first airbag after inflated and expanded, the second communication portion and the second airbag are communicated directly, and the first communication portion and the second airbag are communicated via a communication passageway communicated with the first communication portion and the intake hole. Hereinafter, embodiments of the present invention will be described with reference to the accompanying drawings.

First Embodiment

A structure according to a first embodiment of the present invention will be described with reference to FIG. 1 to FIG. 5. An airbag device 1 for motor vehicle, according to the first embodiment, is provided with: a sensor which detects rapid braking or the like at the time of a collision or any other event similar thereto (not shown); an inflator 5 which is arranged at a front side FR area of a front passenger seat 14 of an instrument panel 10 and which is capable of ejecting and supplying gas by way of a signal from the sensor; an airbag 2 (first airbag) for front passenger seat having a gas inflow hole 2d which is connected to the inflator 5 and into which gas G1 ejected from the inflator 5 can be flowed; and a center side airbag 3 (second airbag) which is arranged on a center a transverse side of the airbag 2 for front passenger seat, in other words, in the front side FR area of a center seat 15 arranged between the passenger seat 14 and a driver seat 13, a respective one of which is a front seat 12 and is adapted to communicate with the airbag 2 for front passenger seat by way of first and second communication portions 6, 7. Reference numeral 11 designates a steering wheel. It is well known whether or not an airbag is incorporated in the steering wheel 11; and therefore, its related description is not given hereinafter.

The airbag 2 for front passenger seat is shaped like a bag, and is formed of a front face portion 2a which is capable of retaining an occupant, although not shown, who sits down on the front passenger seat 14 at the time of a front face collision; a first side face portion 2b which is arranged on a transverse center side of the front face portion 2a; and a second side face portion 2c which is arranged on a transverse lateral side of the front face portion 2a. In the second side face portion 2c, a first vent hole 8 is formed.

The center side airbag 3 is formed in a shape of a bag while the airbag is partitioned by: a front face portion 3a which is capable of retaining an occupant, although not shown, who sits down on the center seat 15 at the time of a front face collision, or alternatively, an occupant, although not shown, who sits down on the front passenger seat 14 at the time of an oblique collision; a first side face portion 3b which is arranged on the side of the driver seat 13 of the front face portion 3a; and a first side face portion 2b of the airbag 2 for front passenger seat. In the first side face portion 3b, a second vent hole 9 is formed.

The first and second communication portions 6, 7 both are formed in the first side face portion 2b. The first communication portion 6 is arranged at a position which is proximal to the inflator 5 and the gas inflow hole 2d. The second communication portion 7 is arranged at a position proximal to the occupant side end in the airbag 2 for front passenger seat, the position being arranged in a direction of inflation and expansion of the airbag 2.

Here, the above definition that "the first communication portion 6 is arranged at a position proximal to the inflator 5 and the gas inflator hole 2d" means that "the first communication portion 6 is arranged at a position most proximal to the inflator 5 and the gas inflow hole 2d among all communication portions including other communication portions, and in a same manner, "the first communication portion 7 is arranged at a position proximal to the front passenger seat 14" means that "the second communication portion 7 is arranged at a position most proximal to the occupant side end of the airbag 2 for front passenger seat among all communication portions including other communication portions". That is, the location of the first and second communication portions 6, 7 may be changed appropriately, such as arranging the communication portions 6, 7 as close as possible to the inflator 5 or the occupant side end of the airbag 2, respectively, according to the shape or volume of the airbag, in so far as the positional relationship between the first and second communication portions 6, 7 is maintained within a range of allowing each communication portions 6, 7 to provide their performance. Moreover, any additional other communication portions may be arranged between the first and second communication portions 6, 7, as long as the communication portions 6, 7 are arranged most proximal to the inflator 5 or the front passenger seat 14, respectively, with respect to the other communication portions.

Figure 4:
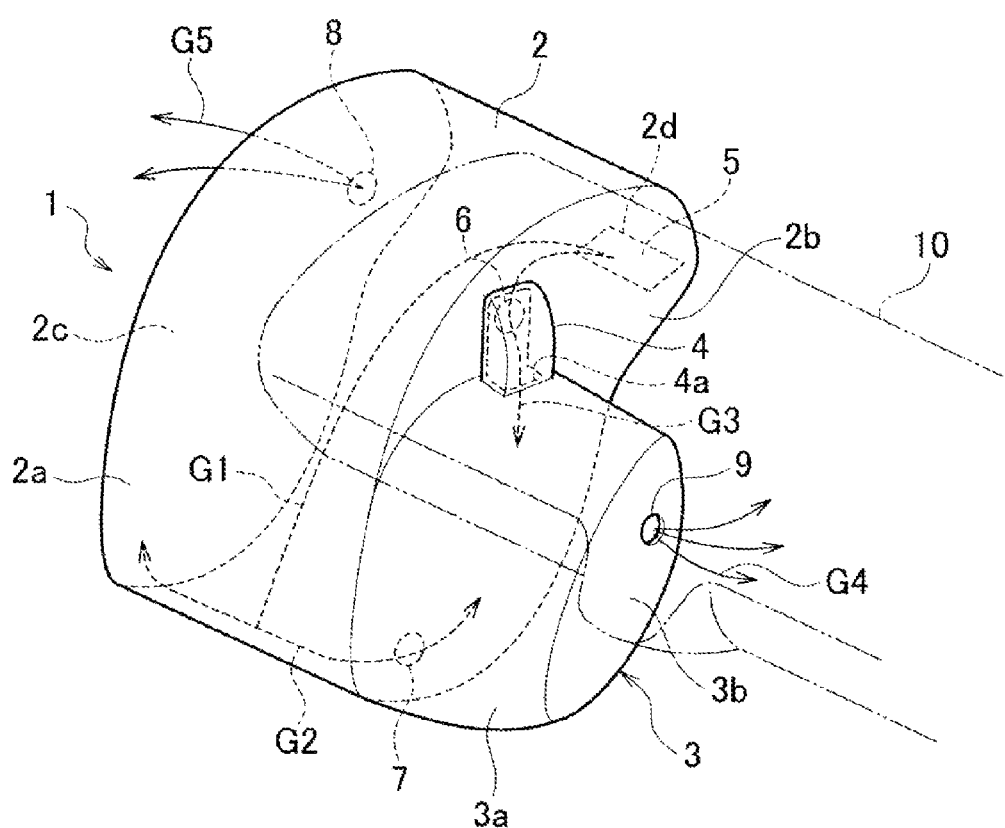
FIG. 4 is a perspective view showing a state in which the center side airbag inflates and expands from the airbag for front passenger seat of FIG. 2.

Between the first communication portion 6 and the intake hole 4a of the center side airbag 3, a communication passageway 4 having a predetermined length L (reference should be made to FIG. 5) and a predetermined width H (reference should be made to FIG. 5) is integrally formed of a front face portion 3a of the center side airbag 3 and a cloth. In addition, the front face portion 3a of the center side airbag 3, as shown in FIG. 4, is rolled up to be formed in a cylindrical shape at the time of molding; and however, the shape of the center side airbag 3 can be appropriately changed by varying angles θ1, θ2 at the positions (transversely symmetrical) indicated by reference numerals 3aa, 3ab of FIG. 5. The shape of the first side face portion 3b can also be changed to a shape such as a substantially triangular or a substantially perfect circle. The front face portion 3a and the first side face portion 3b are sewn together.

The airbag 2 for front passenger seat and the center side airbag 3 are mounted to an airbag container which is housed in the instrument panel 10 in a state in which these airbags are always folded and supported by a motor vehicle body, although not shown. After that, the airbag 2 for front passenger seat is inflated and expanded by the gas G1 that is ejected by the inflator 5 when detecting rapid braking or the like at the time of a collision with a motor vehicle or any accident like that, whereby the airbag bursts out from the instrument panel 10. The airbag 2 for front passenger seat, having burst out, is arranged so as to be guided to a front wind shield panel, although not shown, and expand toward the vehicle chamber side.

Next, functions according to the embodiment will be described.

When the inflator 5 detects rapid braking or the like at the time of a collision with a motor vehicle or any other event similar thereto, the inflator 5 ejects the gas G1. If the ejected gas G1 is flown from the gas inflow hole 2d into the airbag 2 for front passenger seat, diffusion toward the front passenger seat 14 exerted by general features of the gas G1 takes place, whereby the airbag 2 for front passenger seat inflates and expands in an early stage. At the same time, gas G3 which is ejected from the first communication portion 6 proximal to the inflator 5 to the outside of the airbag 2 for front passenger seat in an early stage flows into the center side airbag 3 through the intake hole 4a via the communication passageway 4.

At that time, in place of a construction in which an area leading up to the first communication portion 6 is directly covered with the center side airbag 3 in order to cause the gas F to flow into the center side airbag 3 after the airbag 2 for front passenger seat has been inflated speedily, there was employed a communication passageway adapted to make communication by way of the communication passageway 4 that is formed in the shape of a communication passageway having a small sectional area at the time of inflation, specifically, that is formed in a shape having an inclination of which an sectional area increases from the side covering the first communication portion 6 to the intake hole 4a that is a gas introducing portion of the center side airbag 3. In this manner, a small amount of gas merely flows through the gas inflow hole 2d, whereby the communication passageway 4 that is formed in the shape of a passageway inflates and then the gas G that is produced subsequent to the inflation easily flows into the passageway and further inflation of the center side airbag 3 subsequent to inflation of the airbag 2 for front passenger seat can be speedily carried out.

Moreover, there is attained an advantageous effect that the inflation and expansion speed of the center side airbag 3 can be increased by arranging the second communication portion 7 at a position proximal to the occupant side end of the airbag 2 than other communication portions. Detailed description is as follows.

First, as shown in FIG. 4, when the inflator 5 operates, the gas G1 ejected from the inflator 5 flows into the airbag 2 through the gas inflow hole 2d. The gas G1, as shown by dashed arrow, flows along the front face portion 2a in the airbag 2, and hits against the airbag 2 for front passenger seat at a position most proximal to the occupant side end, which is the most distant point from the gas inflow hole 2d. Then, the gas G1 returns (divided to right and left) at the occupant side end to thereby become gas flow G2. Therefore, at an inner portion of the airbag 2, the position close to the occupant side end, at which the gas G1 returns, becomes a position where gas density is very high. Accordingly, by arranging the second communication portion 7 to the position close to the occupant side end and having high gas density, gas flow rate, per unit time, of the gas G2 flown into the airbag 3 through the second communication portion 7 becomes high, thus the inflation and expansion speed of the center side airbag 3 can be increased, etc.

The gas G1, as designated by reference numeral G5, is ejected from the first vent hole 8 to the outside of the airbag 2 for front passenger seat, and as designated by reference numeral G4, is ejected from the second vent hole 9 of the center side airbag 3 to the outside of the center side airbag 3 to thereby reduce an inflation pressure of a respective one of the airbag 2 for front passenger seat and the center side airbag 3. The location, size or number of the second vent hole 9 may be changed according to a shape or volume of the airbag 2 and the airbag 3.

In addition, the center side airbag 3, as shown in FIG. 4, has a smaller volume than that of the airbag 2 for front passenger seat; and therefore, there is attained an advantageous effect that a speed for establishment of an inflation and expansion state in which protection of an occupant for the center side airbag 3 can be protected, that is, a speed for establishment of the state shown in FIG. 4 increases and moreover the gas capacity of the inflator 5 can be reduced and thus the manufacturing costs of the inflator 5 can be reduced.

Moreover, in the present embodiment, the first communication portion 6, which is one of the communication portions between the airbag 2 and airbag 3, is arranged closer to the inflator 5 in order to speedup the inflation and expansion speed of the center side airbag 3. However, as the communication between the airbags 2 and 3 can be achieved via the communication portions, the center side airbag 3 itself is not necessary to be arranged proximal to the inflator 5 to be expanded, and the inflation and expansion speed of the center side airbag 3 can be speedup with the assumed optimal volume of the airbag is maintained.

Figure 5:
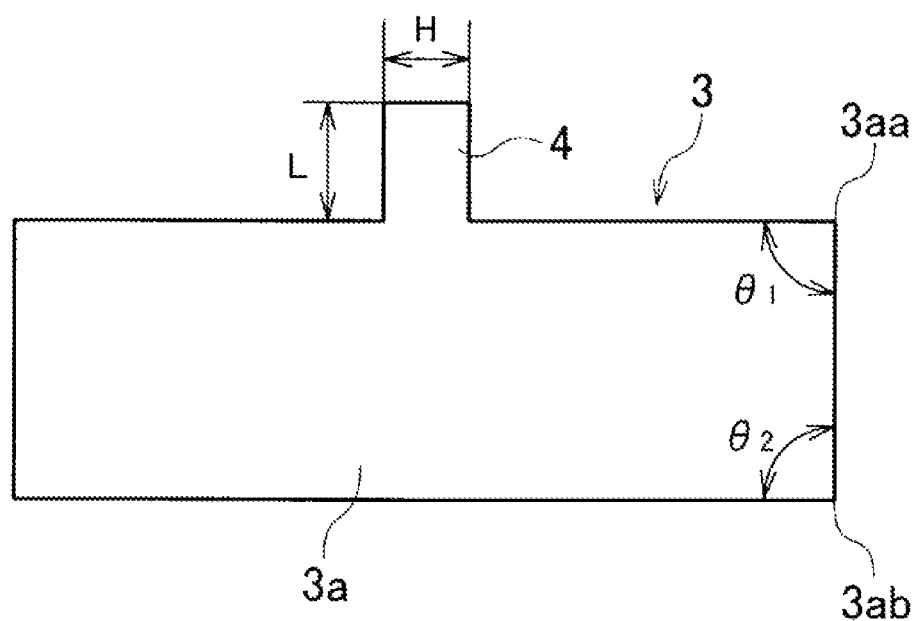
FIG. 5 is a view showing a cut panel pattern for production of a front face portion of the center side airbag of FIG. 4.

In addition, in so far as the center side airbag 3 is concerned, the communication passageway 4 formed in a cylindrical shape together with the airbag 2 for front passenger seat and the front face portion 3a facing the occupant side are integrally formed as shown in FIG. 5; and therefore, there is attained an advantageous effect that the manufacturing costs of the center side airbag 3 can be reduced further. Of course, the communication passageway 4 may be formed separately.

According to the above embodiment of the present invention, the foregoing embodiment has described that the first communication portion 6 is arranged at the position that is proximal to the inflator 5 and the gas inflow hole 2d; and however, there may be a positional relationship which is determined by controlling the inflow rate of the gas G3 depending on the inflation speed of the center side airbag 3 and the volume of the airbag after inflated, without being limited thereto, or alternatively, it may be possible to appropriately control the inflow rate depending on the dimensions of the length L or the width H of the communication passageway 4, and the mounting angle of the communication passageway 4 from the first communication portion 6 to the intake hole 4a may be appropriately inclined to the vertical.

What is claimed is:

1. An airbag device for motor vehicle, comprising:
   an inflator that is arranged in an instrument panel at an area in front of a front passenger seat and is capable of ejecting gas;
   a first airbag that is connected to the inflator at a base end side thereof and has a gas inflow hole through which the gas can be flowed, the first airbag being for the front passenger seat; and
   a second airbag that is arranged on the first airbag at a side face portion close to a center in a vehicle width direction, the second airbag being adapted to communicate with the first airbag through communication portions that are formed on the side face portion,
   wherein the communication portions includes:
   at least a first communication portion and a second communication portion;
   an intake hole formed adjacent to the first communication portion in the second airbag; and
   a communication passageway having a predetermined length and communicated with the first communication portion and the intake hole,
   wherein the first communication portion is arranged so as to be more proximal to the inflator at the side face portion of the airbag for the front passenger seat than the second communication portion,
   the second communication portion is arranged so as to be more proximal to an occupant side end than the first communication portion on the side face portion of the first airbag after inflated and expanded,
   the second communication portion and the second airbag are communicated directly, and
   the first communication portion and the second airbag are communicated via the communication passageway.

2. The airbag device for motor vehicle, according to claim 1, wherein the second airbag is biased to the occupant side end of the side portion of the first airbag and has a volume smaller than a volume of the first airbag.

3. The airbag device for motor vehicle, according to claim 1, wherein the second airbag is integrally formed of: the communication passageway formed in a cylindrical shape together with the first airbag; and a front face portion facing an occupant side.

* * * * *